UNITED STATES PATENT OFFICE.

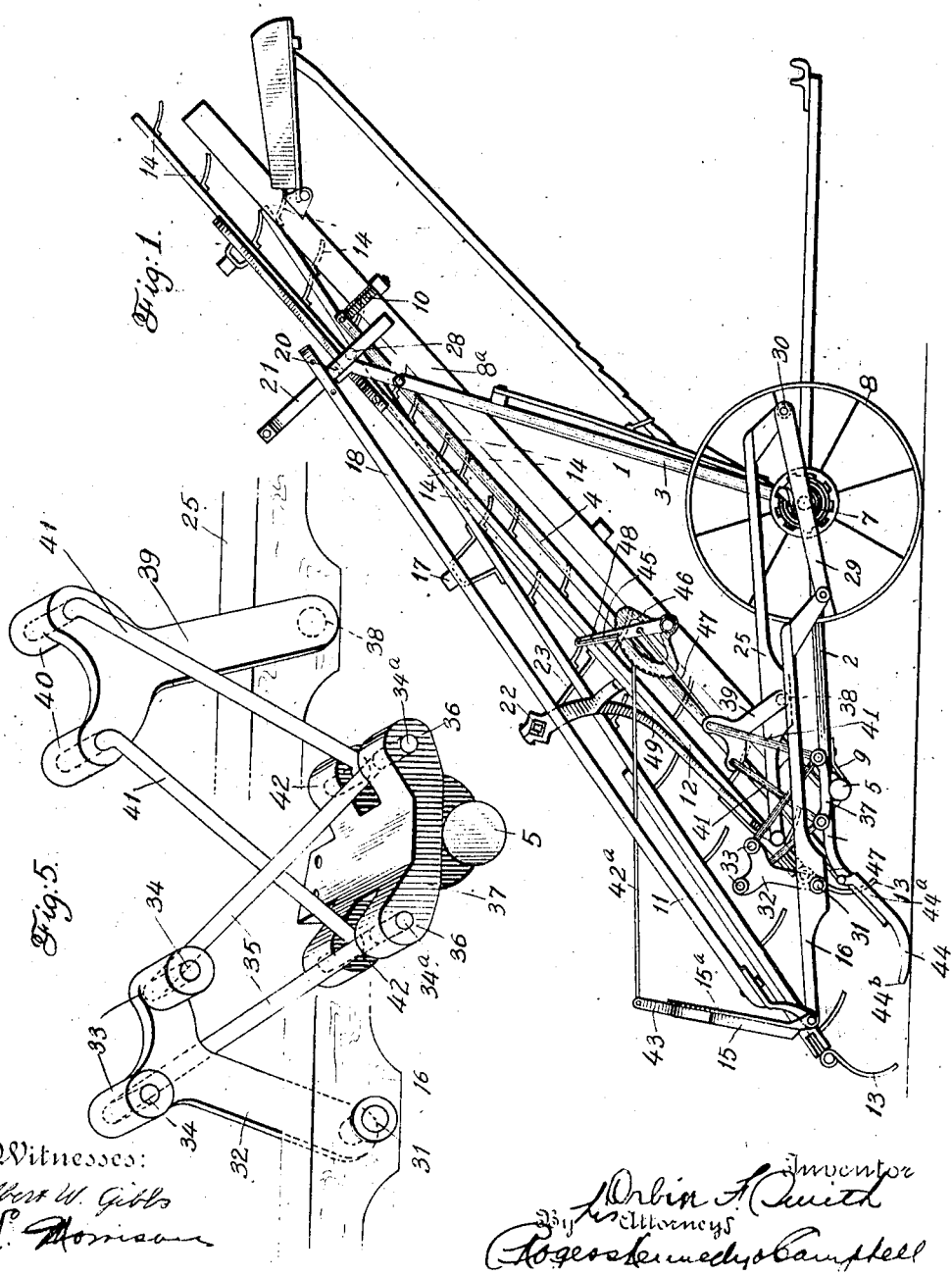

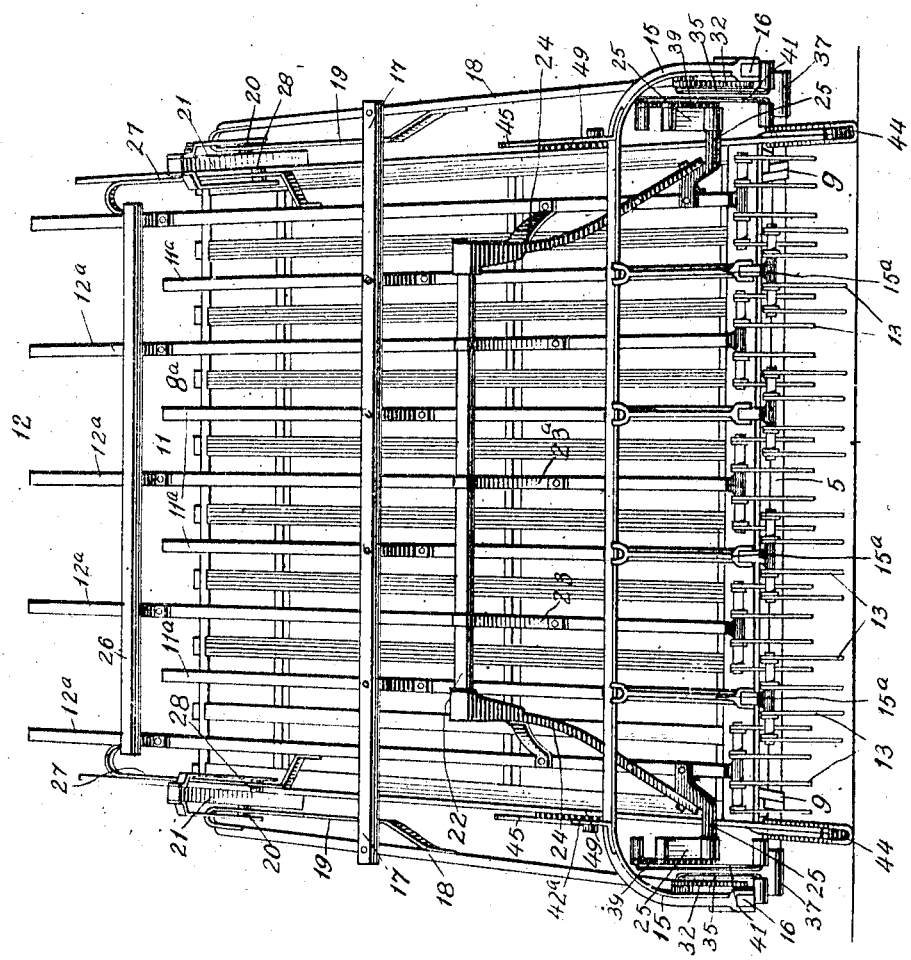

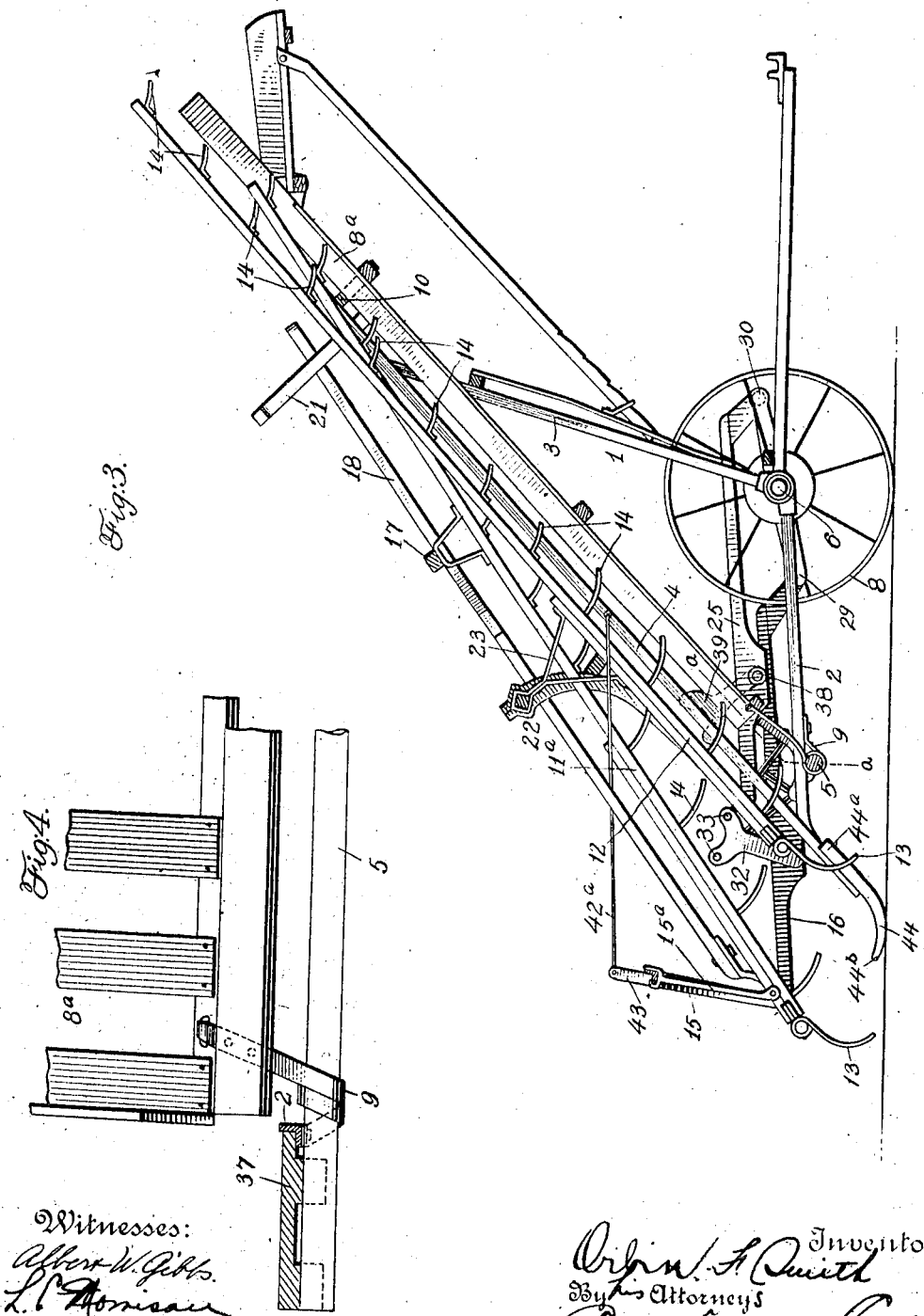

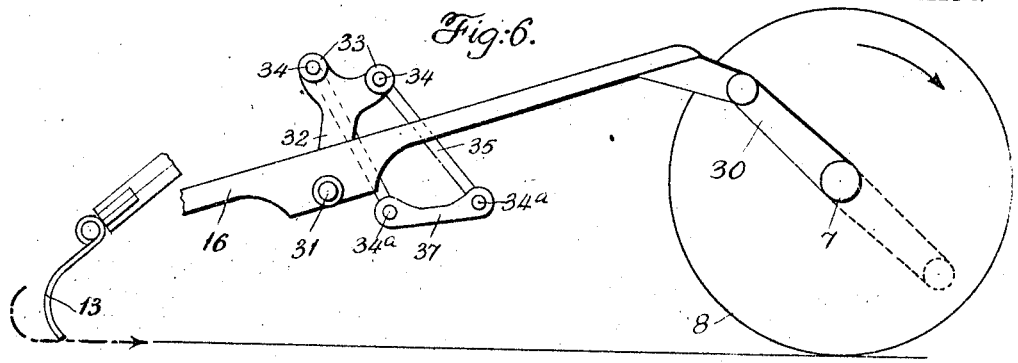
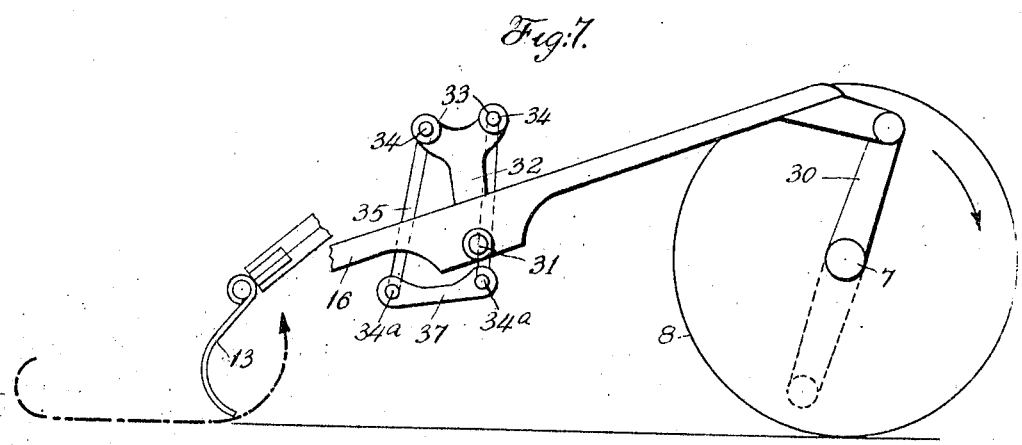
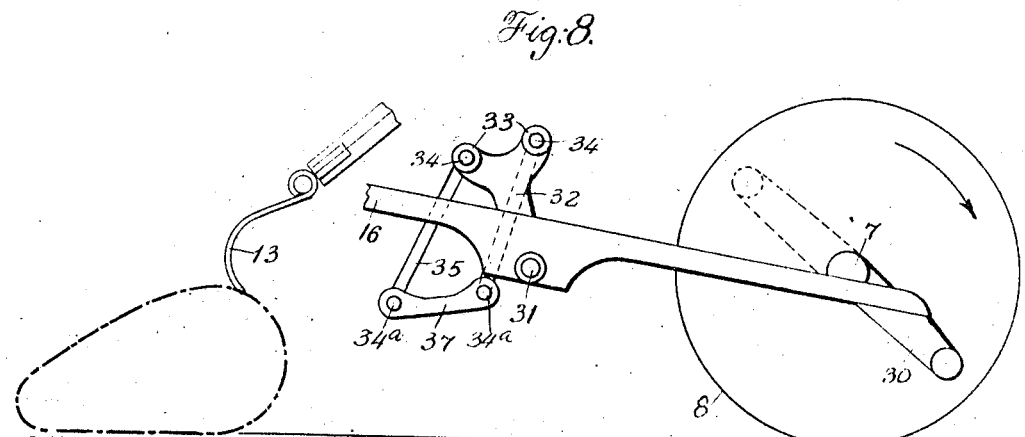

ORBIN F. SMITH, OF MOLINE, ILLINOIS, ASSIGNOR TO MOLINE PLOW COMPANY, A CORPORATION OF ILLINOIS.

HAY-LOADER.

1,054,322.      Specification of Letters Patent.     Patented Feb. 25, 1913.

Application filed July 22, 1911. Serial No. 639,887.

*To all whom it may concern:*

Be it known that I, ORBIN F. SMITH, a citizen of the United States, residing at Moline, in the county of Rock Island and State of Illinois, have invented certain new and useful Improvements in Hay-Loaders, of which the following is a specification, reference being had therein to the accompanying drawing.

This invention relates to hay loaders of the type embodying a wheeled frame equipped with reciprocating rake bars driven from the ground wheels in such manner that, as the machine is drawn over the field in rear of a wagon, the hay will be gathered and elevated by the rake bars and discharged into the wagon.

In hay loaders of this type it is common to arrange the rake bars in groups, and to operate them alternately by rotary means, such as cranks and the like, deriving their power from the ground wheels, and in order that the rake bars may be given the proper motion to effectively perform their raking and elevating functions, various devices have been employed to translate or modify the motion imparted by the driving means, such devices coöperating with the respective groups of bars and causing them to pursue, in their reciprocating motions, a path of travel most effective for gathering and elevating the hay.

The present invention consists primarily of improved devices for thus translating or modifying the motion imparted to the rake bars by the driving means, such improved devices being characterized by the support of the respective groups of bars near their lower ends on swinging fulcra in such manner that the rotary driving motion imparted by the ground wheels, will cause the rake bars to act in a rectilinear line in their raking strokes, so as to properly gather the hay, and at the completion of said stroke the rake bars will rise or lift so as to deliver the gathered hay onto the elevator bottom, where it will be subject to the elevating action of the bars.

The invention consists also of various improved features of construction in the general organization, which features will be fully described in the specification and the novel parts pointed out in the claims.

In the accompanying drawings: Figure 1 is a side elevation of a hay loader with my invention embodied therein. Fig. 2 is a top plan view of the same. Fig. 3 is a longitudinal sectional elevation from front to rear. Fig. 4 is a transverse section on the line *a—a* of Fig. 3. Fig. 5 is a perspective view on an enlarged scale of the swinging supporting means for the two groups of rake bars. Figs. 6, 7 and 8 are diagrammatic views showing the action of the rake bar supporting means in controlling the path of movement of the rake bars.

The frame of my improved machine comprises two triangular frame sections 1—1, each comprising a bottom frame bar 2, a front upwardly inclined bar 3, and a rear inclined bar 4. At their rear lower corners these triangular frame sections are connected fixedly and firmly together by a horizontal transverse bar 5, while at their forward lower corners the triangular frame sections are provided with bearings 6—6 in which is mounted an axle 7 having suitable ground wheels 8—8 clutched thereto as usual, so that the wheels will turn with the axle when the machine advances, but will move idly on the axle when the machine is backed.

The wheeled frame thus constructed is provided with an inclined slatted bottom 8$^a$, consisting of a series of parallel longitudinally extending slats, connected together at intervals by cross bars, which slatted bottom is so mounted on and sustained by the wheeled frame that the former may yield downwardly as a whole with reference to the frame. To provide for this yielding support of the bottom, the latter is connected at its lower end to spring arms 9—9 coiled around the bar 5 and fixed at their ends to the side bars 2—2 respectively. At its upper end the slatted bottom is hung from the side bars 4 of the triangular frame sections, by means of suspension springs 10—10, which springs are connected at their upper ends to the respective frame bars 4, and at their lower ends to the slatted bottom on opposite sides of the same. The purpose of this construction is to prevent injury to the rake bars in the event of the hay becoming clogged between the bars and slatted bottom, the yielding support for the bottom permitting the same to give, and thereby relieving the rake bars of strain.

Overlying the slatted bottom are a series of rake bars arranged in two groups 11 and 12, so as to act alternately, the rake bars being provided as usual with gathering teeth 13 at their lower ends, and with elevating teeth 14 arranged at intervals on the under side of the bars throughout their length, and adapted in the reciprocation of the bars to coöperate with the slatted bottom in elevating the hay.

The rake bars 11ª of the group 11 are connected together at their lower ends by means of a transverse arched connecting bar 15 provided at intervals with fixed hanger bars 15ª pivoted at their lower ends to the respective rake bars 11ª, the said arched connecting bar being connected at its ends to the rear ends of operating levers 16—16 respectively, arranged on opposite sides of the machine and by which levers a reciprocating motion is imparted to the group 11 of rake bars in a manner to be more fully described hereinafter. Near their upper ends the rake bars 11ª are connected together by a transverse tie-rod 17 fixed at its ends to longitudinally extending bars 18—18 respectively, which bars extend downwardly at the opposite sides of the frame and have their lower ends jointed to the rear ends of the operating levers 16—16 before alluded to. By this means the group of rake bars will be moved as a whole by power applied by the operating levers to both the upper and lower ends of the group. The group of connected bars are guided and supported at their upper ends by rails 19—19 extending longitudinally along and spaced from the inner sides of the two bars 18—18, which rails, as the group of bars are reciprocated, travel on and are supported by friction rolls 20—20 mounted on standards 21—21 extending upwardly from the frame bars 4—4 respectively.

The rake bars 12ª of the group 12 before alluded to, are connected together near their lower ends by a transverse connecting bar 22 having brackets 23, 23ª, etc., depending therefrom, which brackets are fixed at their lower ends to the respective rake bars of the group. Arms 24—24 are fixed rigidly at their upper ends to the ends of the bar 22 and are extended downwardly and outwardly in opposite directions and have their lower ends jointed to the rear ends of operating levers 25—25 respectively, arranged on opposite sides of the machine, and by which means a reciprocating motion is imparted to this group of bars in a manner more fully described hereinafter.

At the upper ends the group of bars 12ª are connected together by means of a transverse tie-rod 26, and the bars are supported and guided at the upper ends by means of two longitudinal rails 27, fixed to and extending parallel with the outer rake bars of the group, and supported and sliding on friction rolls 28 mounted on the inner sides of the standards 21 before alluded to.

Inasmuch as the operating levers for the two groups of rake bars and the means of actuating said levers, are the same on both sides of the machine, a description of one set will suffice.

The operating levers 16 and 25 before alluded to extend side by side, and have their forward ends jointed to diametrically opposed cranks 29 and 30 respectively, fixed to the axle 7, so that by the rotation of the cranks the operating levers will be reciprocated alternately in opposite directions and will impart motion to the groups of rake bars.

Between its ends the operating lever 16 is mounted to rock on a stud 31 projecting outwardly horizontally from the lower end of a vibrating hanger 32, the upper end of which is formed with two horizontal outwardly projecting hollow studs 33—33, in which are loosely mounted the upper outwardly turned ends 34—34 of links 35—35. The lower ends of these links are extended laterally horizontally as at 34ª and mounted loosely in bearing openings 36—36 formed in the opposite ends of a bracket plate 37 at its outer side, which bracket plate is fixed to the bottom frame bar 2. The relation of the lever 16 to its driving crank 29, the links 35—35, and the vibrating hanger 32, is such that when the rake bars 11ª, operated by this mechanism, are at the beginning of their raking stroke, the crank 29 and the links 35—35 will be in parallelism, and will form in effect a parallel motion controlling the lever 16, the crank 29, and the links 35—35 inclining rearwardly and upwardly slightly, and the hanger 32 being inclined to the rear as shown in Fig. 6. When now the ground wheel is turned in the direction of the arrow as the machine advances, the crank 30 will move upwardly and forwardly, thereby drawing the lever 16 endwise in a forward direction, the links 35—35 in this movement swinging upwardly toward an upright position and maintaining their parallelism with the crank. During such forward movement of the parts and while the substantial parallelism of the links 35 and crank 30 is maintained, there will be no fulcruming action of the lever on its hanger; hence the parts connected with the rear end of the lever, that is the group of rake bars 11, will be drawn forward horizontally with the result that the rake teeth on the lower ends of the bars will move forward in a straight horizontal line. This movement will continue until the crank reaches a point in its revolution where it passes down on the side of the wheel opposite where it started, and where it will cease to be in parallelism with the links 35, the latter having reached the limit of their forward movement after being swung forward with the crank. When this stage of the operation is reached, the rake teeth will have completed their forward horizontal raking stroke, and the continued downward movement of the crank (and as the latter passes center) will rock the forward end of the lever down on the fulcrum 31 and raise its rear end, with the result that the rake bars will be raised at the end of the raking stroke, and will in this raising action deliver the gathered hay to the slatted bottom. In the further movement of the crank, the lever 16 will be pushed endwise bodily to the rear, in which action the links 35—35 will swing to the rear and toward an upright position, thereby bodily lifting the fulcrum on which the lever is supported, with the result that the rake bars will be carried to the rear in a downwardly curved path. As the crank now continues, to complete its rotation, and as the links in this motion reach the limit of their rearward swing, the crank will pass center in its opposite position, thereby lifting the forward end of the lever and depressing its rear end, with the result that the rake bars will be lowered to their starting point, shown in Fig. 6. It is seen, therefore, that by the peculiar arrangement and construction of the links, and vibrating hanger, by which the lever is supported, a circular rotation of the crank is converted into a motion of the rake bars most effective for the raking and elevating actions, 0 said bars moving forward in their raking stroke in a straight horizontal line, then rising suddenly in a forward direction to deliver the gathered hay to the slatted bottom, and then continuing to rise and moving to the rear in a curved path and finally moving downwardly to the point of beginning.

The lever 25 for the other group of rake bars 12ª is connected and operated in precisely the same manner to its crank and supporting hanger and links, the only difference being that the parts are so related that the actions of the two groups of rake bars will alternate with each other, one group moving forwardly as the other retreats. The lever 25 is mounted between its ends on a stud 38 projecting inwardly from the lower end of a vibrating hanger 39, the upper end of which is provided with two inwardly projecting horizontal hollow studs 40—40 in which are loosely mounted the upper inwardly turned ends of links 41—41. The lower ends of these links are extended horizontally inwardly and mounted loosely in horizontal bearing openings 42—42 in the opposite ends of the bracket plate 37 before alluded to, at the inner side of said plate.

It will be remembered that the arched connecting bar 15 for the group of rake bars 11ª was described as being pivoted, by means of the depending hangers 15ª, to the respective bars of the group, and in order that this arched bar may be maintained in an upright position and prevented from interfering with the connecting bar 22 for the other group of rake bars, as the two groups are reciprocated in opposite directions, I connect the arched bar 15 with the frame bars 4 of the machine by means of forwardly extending links 42ª—42ª, one on each side of the machine, which links are pivoted at their rear ends to arms 43—43 extending upwardly from the arched bar 15 near its ends, and are pivoted at their forward ends to the side bars 4—4 of the frame. As a result of this arrangement, when the group of bars 11 are moved forwardly in the raking action, the arched bar will be held to the rear by the connecting links so that the connecting bar for the other group of rake bars will be permitted to make its full backward stroke as said rake bars move to the rear, and there will be no interference between said connecting bars.

At the lower rear corners of the wheeled frame, there are provided two supporting shoes 44—44, one on each side, which shoes bear upon the surface of the ground as the machine advances, and determine the angular relation of the frame as a whole to the horizontal. Each of these shoes is in the form of a flat plate containing an upwardly inclined portion 44ª and a horizontal rearwardly inclined portion 44ᵇ, the upwardly inclined portion being slidingly mounted on the rear extremities of the two frame bars 2 and 4 respectively, by which construction the shoes may be moved up and down on the extremities of the frame bars. The purpose of this movement of the shoes is to vary the distance between the lower end of the frame and the surface of the ground, so that the proper and effective relation between the rake bar teeth in their forward raking stroke, and the surface of the ground may be preserved. Each of the movable shoes is adjusted and held in its adjusted position by means of a hand lever 45 pivoted at its lower end to a bracket plate 46 fixed to the side bar 4 of the frame and having jointed to it the forward end of a link 47 whose rear end is jointed to the sliding shoe 44. The lever is provided with a locking latch 48 coöperating with a toothed segment 49 fixed to the frame bar, by which means the lever may be held in its different positions of adjustment.

In the foregoing description and in the accompanying drawings I have disclosed my invention in the specific form I prefer to adopt, but it is manifest that as far as the invention in its broader aspects is concerned, the details and specific means shown may be variously changed and modified, without departing from the limits of my invention—and it is to be understood that the invention is not limited to any particular form or details of the parts except in so far as such limitations are specified in the claims.

Having thus described my invention, what I claim is:

1. In a hay loader, the combination of an elevator frame, raking devices thereover, a reciprocating operating lever having operative connection with the raking devices, and supporting means for said operating lever, said supporting means comprising relatively movable parts connected together, one of said parts jointed to the frame and the other connected to the operating lever.

2. In a hay loader, the combination of an elevator frame, raking devices thereover, a reciprocating operating lever having operative connection with the raking devices, and a guiding support for the lever, said support comprising parts jointed together pivoted respectively to the frame and to the operating lever.

3. In a hay loader, the combination of an elevator frame, raking devices above the same, reciprocating operating levers operatively connected with the raking devices, supporting devices pivoted to the frame, and hangers carried by the supporting devices and operatively connected with said levers.

4. In a hay loader, the combination of an elevator frame, raking devices above the same, reciprocating operating levers operatively connected with the raking devices, supporting devices pivoted to the frame, and members pivoted to the supporting devices and operatively connected with the levers.

5. In a hay loader, the combination of an elevator frame, raking devices above the same, reciprocating operating levers operatively connected with the raking devices, supporting devices pivoted to the frame, and means connecting the levers with said supporting devices at points above the pivotal connection of said supporting devices with the frame.

6. In a hay loader, the combination of an elevator frame, raking devices above the same, reciprocating operating levers operatively connected with the raking devices, supporting devices pivoted to the frame below the levers and extending upwardly, and depending hangers pivoted to the supporting devices and operatively connected with the said levers.

7. In a hay loader, the combination of an elevator frame, raking devices above the same, reciprocating operating levers operatively connected with the raking devices, supporting devices pivoted to the frame and extending upwardly, and hangers pivoted at their upper ends to the upper ends of the supporting devices and pivotally connected at their lower ends to the levers respectively.

8. In a hay loader, the combination of an elevator frame, raking devices above the same, a reciprocating operating lever operatively connected with the raking devices, and a plurality of supporting links pivoted to the frame and extending upwardly and having operative connection with said lever.

9. In a hay loader, the combination of an elevator frame, raking devices above the same, a reciprocating operating lever operatively connected with the raking devices, two links pivoted at their lower ends to the frame and extending upwardly, and a hanger pivoted to the links and connected with the lever.

10. In a hay loader, the combination of an elevator frame, raking devices above the same, a reciprocating operating lever operatively connected with the raking devices, two links pivoted to the frame and extending upwardly therefrom, a hanger pivoted to the upper ends of the links and extending downwardly and pivotally connected at its lower end with the lever.

11. In a hay loader, the combination of an elevator frame, raking devices thereover, a driving crank, an operating lever connected therewith and connected also with the raking devices, a plurality of links pivoted to the frame to swing back and forth as the crank is rotated, and a member pivotally supporting said lever from the links.

12. In a hay loader, an elevator frame equipped with raking devices and having a stiff bottom movably supported by the frame and yieldable as a whole with reference to the frame.

13. In a hay loader, an elevator frame equipped with raking devices and provided with a stiff bottom yieldable as a whole with reference to the frame.

14. In a hay loader, the combination of an elevator frame, a series of longitudinally extending rake bars thereover, a lower transverse bar to which said rake bars are respectively connected, an upper transverse bar to which said rake bars are also respectively connected, reciprocating operating levers jointed at their rear ends to the lower transverse bar, longitudinally extending bars jointed at their rear ends to the rear ends of the reciprocating levers and jointed at their upper ends to the upper transverse bar, said last named bars having guiding surfaces, and fixed guides carried by the frame, with which guides said guiding surfaces coöperate, and by which the longitudinal bars are guided and supported.

In testimony whereof I have affixed my signature in presence of two witnesses.

ORBIN F. SMITH.

Witnesses:
AMY OLSEN,
E. K. LOVERUL.